434-18 SR
1/6/87 OR H 000,186

United States Statutory Invention Registration [19]

[11] Reg. Number: H186
[43] Published: Jan. 6, 1987

Marshall et al.

[54] RECOIL SIMULATOR FOR WEAPONS

[75] Inventors: Albert H. Marshall, Orlando; Paul D. Grimmer, Winter Park; Edward J. Purvis, Winter Park; Randy R. Fields, Winter Park; Edmund Swiatosz, Maitland, all of Fla.

[73] Assignee: The United States of America as represented by the Secretary of the Navy, Washington, D.C.

[21] Appl. No.: 865,993

[22] Filed: May 16, 1986

[51] Int. Cl.[4] ..... F41F 27/00
[52] U.S. Cl. ..... 434/18

*Primary Examiner*—Deborah L. Kyle
*Assistant Examiner*—Michael J. Carone
*Attorney, Agent, or Firm*—Robert F. Beers; Robert W. Adams; Edward V. Hiskes

[57] ABSTRACT

A recoil simulator is disclosed in which one end of a flexible cable is attached to a weapon and the other end to a system comprising a rotating shaft and a clutch. As the trigger of the weapon is pulled a signal is produced which activates the clutch. The clutch creates a sudden pull on the end of the flexible cable simulating recoil.

7 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RECOIL SIMULATOR FOR WEAPONS

BAKCGROUND OF THE INVENTION

This invention relates to a weapon training simulator and more particularly to means in such apparatus for imparting a recoil simulation.

Weapon training simulators should duplicate the sound and motion of the actual weapon to the greatest possible extent if optimum training is to be accomplished. An important part of the motion of a rifle, when it is fired, is recoil.

In an actual rifle, recoil will cause the rifle to move to the rear and upward, and also, in many cases, to the right or left. The exact path of rifle motion caused by recoil depends upon how the rifle is held by the user and upon the user's individual characteristics, for example, whether he is right or left handed, tall or short, massive or thin. Accordingly, an optimum rifle recoil simulator will not generate a single, fixed type of motion for all users. Instead, an optimum simulator will generate a simulated recoil that varies accordingly to exactly those factors which cause actual weapon recoil to vary when the weapon is fired by various shooters in various positions.

Prior art recoil simulators have not totally achieved the requirements of optimum recoil simulation. For example, the recoil simulator taught in U.S. Pat. No. 4,079,525 involves the attachment of a universal join to the barrel of the weapon, and the attachment of the universal joint to a base support by means of a rigid arm. When the trigger of the simulator is pulled, the arm conveys a mechanical impulse to the weapon barrel through the universal joint.

Due to the attachment of the rigid arm to the univeral joint, the weapon barrel is constrained to move within a limited range and in an unnatural manner. Thus, there is deviation from the requirements of optimum recoil simulation.

Other recoil simultors, such as those shown in U.S. Pat. Nos. 4,007,934 and 2,023,497 suffer from similar problems.

Another problem with simulators such as those shown in '934 and '497 is that the simulated weapon is fixed in one location due to the fact that it is rigidly attached to a base support. This inhibits free choice of positions and locations from which the weapon may be fired. Thus, training freedom and realism are sacrificed.

SUMMARY OF THE INVENTION

Accordingly, it is one object of this invention to provide a weapon recoil simulator with recoil motion closely resembling that of the actual weapon firing under the same conditions.

It is a further object of this invention to provide simulated recoil without unduly constraining freedom of choice in weapon firing position or location.

The foregoing and other objects of the invention are achieved by attaching a flexible cable to the simulated weapon to which an impulse force is applied in response to pulling of the trigger of the weapon. Since the impulse force is applied with a flexible cable, the motion of the weapon is not confined or directed in any way once the recoil force has been applied. This freedom allows the simulated recoil impulse to be dissipated in the shooter's body in exactly the manner that an actual recoil force would be dissipated. Thus, as with an actual recoil, the simulated recoil may differ according to the physical characteristics of each shooter.

The nature of the invention and its several features and objects will be readily apparent from the following detailed description.

DESCRIPTION OF THE PREFERRED EMBODIMENT

Figure 1:
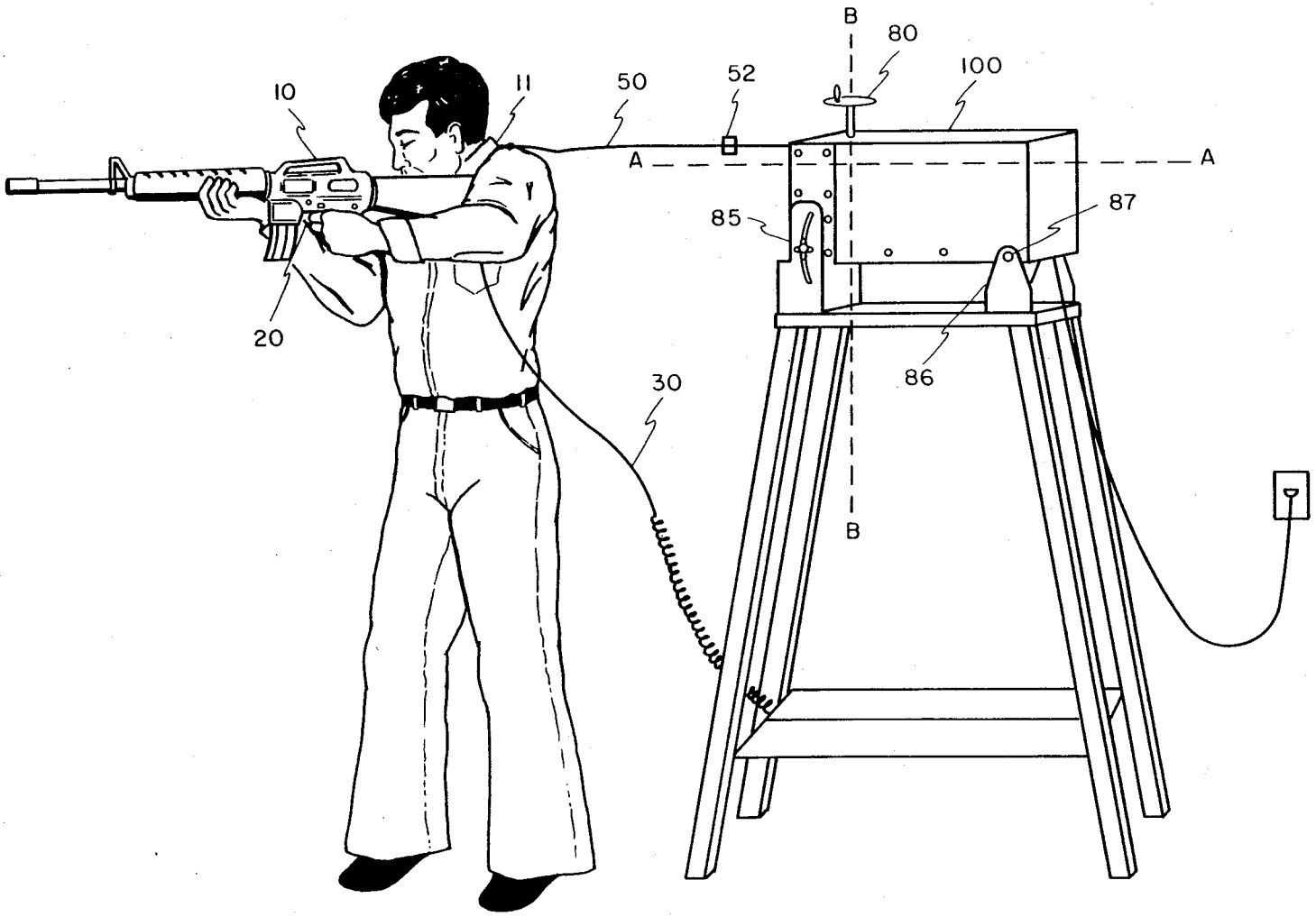
FIG. 1 is an overall view of the recoil simulator.

FIG. 1 illustrates a weapon simulator system using the teachings of this invention. The marksman holds rifle 10 in a natural position. When trigger 20 of the rifle is pulled, a switch affixed to the rifle closes, and a signal is sent by means of wire 30 to impulse generation unit 100.

A cable 50 extends from unit 100 and is attached to the butt of rifle 10. When a signal is sent over wire 30, the impulse unit applies a sharp impulse of pulling force to the butt of the rifle by way of cable 50. This impulse simulates the mechanical impulse generated by normal rifle recoil.

If desired, cable 50 may be affixed to the weapon by means of bracket 60, which is bolted flush with the flat end of the weapon stock, and which may extend slightly above the stock. This extension allowed by bracket 60 allows the cable to clear the shoulder of the shooter even if the weapon is held in a position such that the entire stock is against the shoulder.

Stopping block 52 is a small block of metal affixed to cable 50. This prevents withdrawal of the cable into unit 100 past a certain point.

Handle 80 adjusts the extensions of a jack located within unit 100. This jack raises or lowers the mechanism contained within unit 100 so that cable 50 exits unit 100 at a low angle. This reduces wear upon the cable caused by rubbing against the exit hole. Front legs 85 contain slots so that the attachement point of unit 100 to the legs may be adjusted. This adjustment is made possible since back legs 86 are attached to unit 100 by pivot pins 87, which allow for slight rotation of unit 100 about an axis passing parallel to the lower back edge of unit 100.

Figure 2:
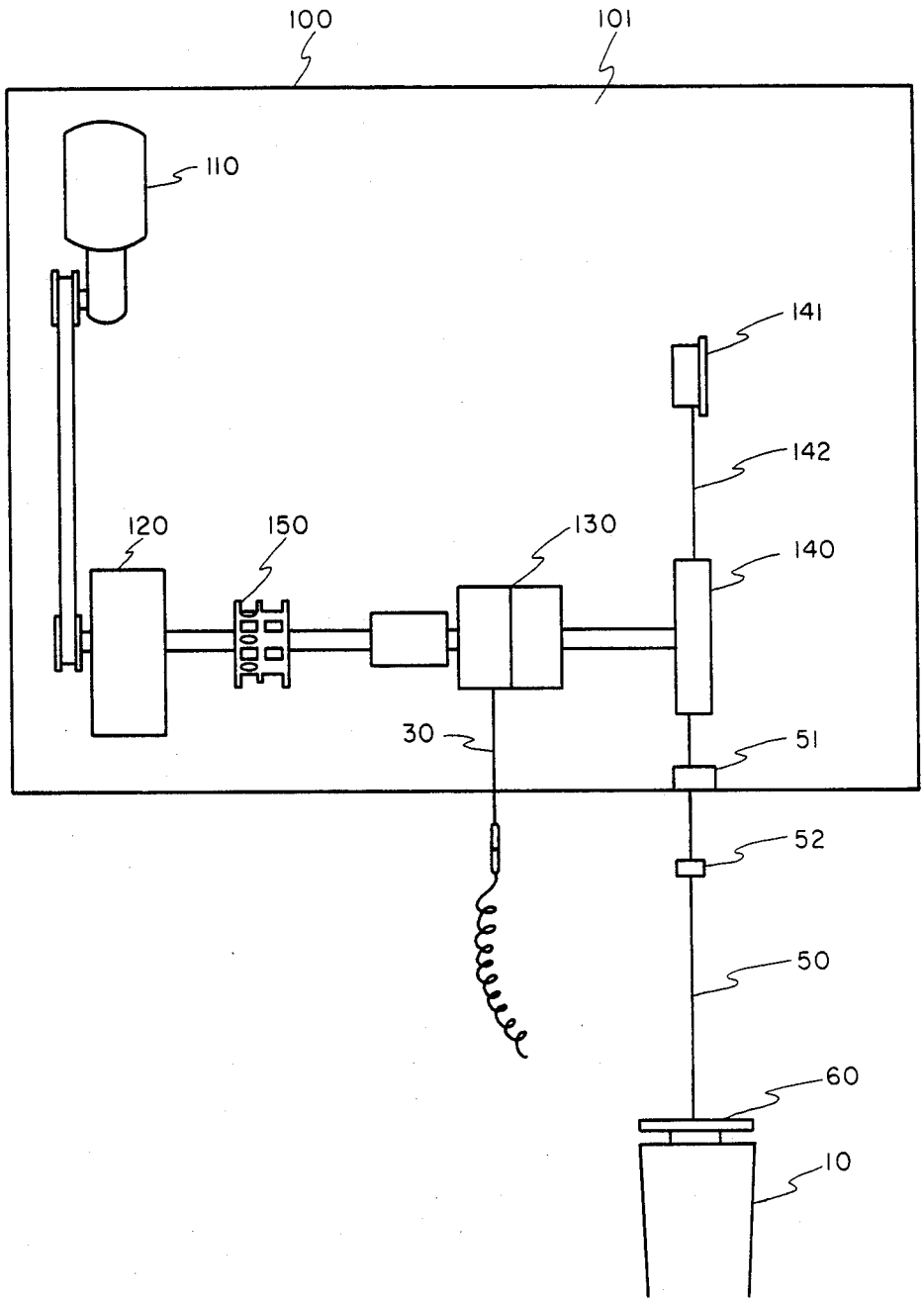
FIG. 2 is a cutaway view of the recoil impulse generating means.

FIG. 2 illustrates the interior of impulse unit 100. It is a cutaway view of unit 100 taken along axis A—A, which axis is shown in FIG. 1. Electric motor 110 supplies kinetic energy to flywheel 120. When a signal is input to the impulse unit on wire 30, electromagnetic clutch 130 engages. The engagement of clutch 130 causes pulley 140 to suddenly rotate in such a direction as to cause a small additional portion of cable 50, attached to pulley 140, to be pulled into unit 100. The said motor, flywheels, and clutches are all bolted to bottom plate 101, which forms a false bottom of unit 100. Plate 101 may be moved up and down within unit 100 by the adjustment of jack handle 80. Bushing 51 reduces friction at the point where cable 50 enters unit 100. Stopping block 52, attached to cable 50, prevents too much cable from being drawn into unit 100. The sudden pulling of cable 50 conveys an impulse of force to bracket 60 and the butt of rifle 10. Thus, recoil is simulated in response to a pull of trigger 20. After the recoil impulse has been simulated, clutch 130 disengages. Ideally, the clutch will be configured to respond to a trigger pull signal input by engaging for a pre-defined period of time and then automatically disengaging.

At times before and after engagement of clutch 130, negator motor 141 and cable 142 act to eliminate slack from cable 30. Motor 141 maintains a constant pull upon cable 142. Cable 142, in turn, attached to pulley 140, causes pulley 140 to rotate such that slack on cable 50 is eliminated. This assures that the force impulse caused by a trigger pull is not merely dissipated in a slack cable.

The level of tension produced by negator motor 141 is set at the minimum level required for slack elmination. Therefore, the user of the weapon simulator may move the rifle to points at varying distances from unit 40 without being disturbed by rearward pulling. If the user moves closer to unit 40, slack in cable 50 is automatically eliminated. Thus, the user may freely vary the distance between himself and the unit 40 while using the simulator. Furthermore, as cable 50 is made sufficiently long, the angle made between the cable at the point where it is attached to the weapon, and the axis of the weapon barrel, can be made arbitrarily small, whether the user is is a standing or prone firing position. Thus, recoil force is applied in a direction which is substantially coaxial with the barrel of the rifle, as it is in an actual rifle recoil impulse.

Negator motor 141 and cable 142 are not strictly required if automatic elimination of slack in cable 130 is not required. The invention could operate without these if the user would adjust his position such that slack on cable 50 was not present. Alternative means employing springs, or some other such means for eliminating slack on cables, could also be employed.

Slip clutch 150 is an optional safety feature that is intended to place an upper limit upon the amount of tension that can be exerted by the flywheel upon, ultimately, the butt of rifle 10. If tension in the cable is too high, clutch 150 will begin to slip and prevent further tranfer of energy from the flywheel to pulley 140.

Figure 3:
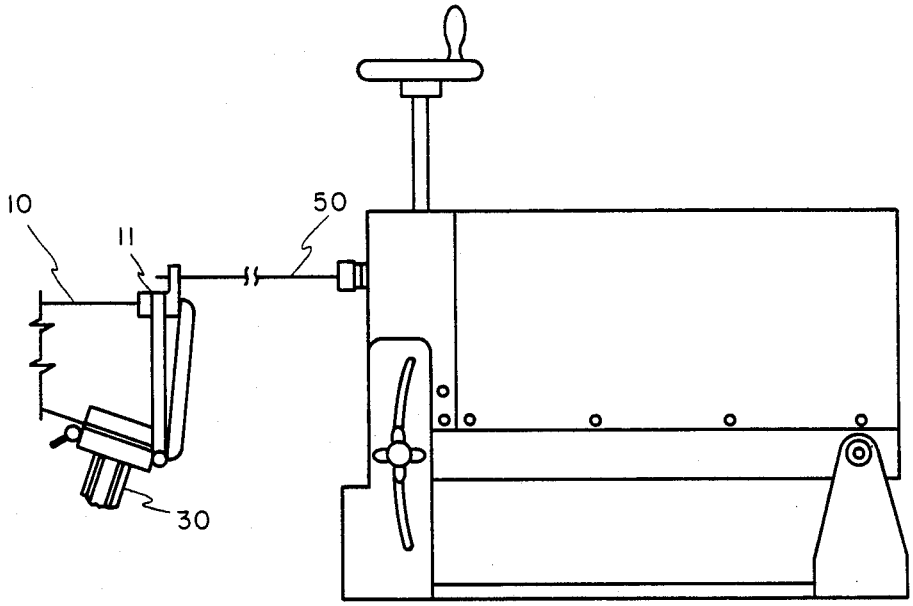
FIG. 3 is a side view illustrating the attachment of the impulse generating means to a simulated rifle.

FIG. 3 is a detailed view illustrating how weapon 10 is attached to cable 50 by means of bracket 11. Bracket 11 allows cable 50 to be attached to the weapon at a point slightly above the highest point of the stock. This provides additional clearance for cable 50 as it passes over the shooter's shoulder.

Figure 4:
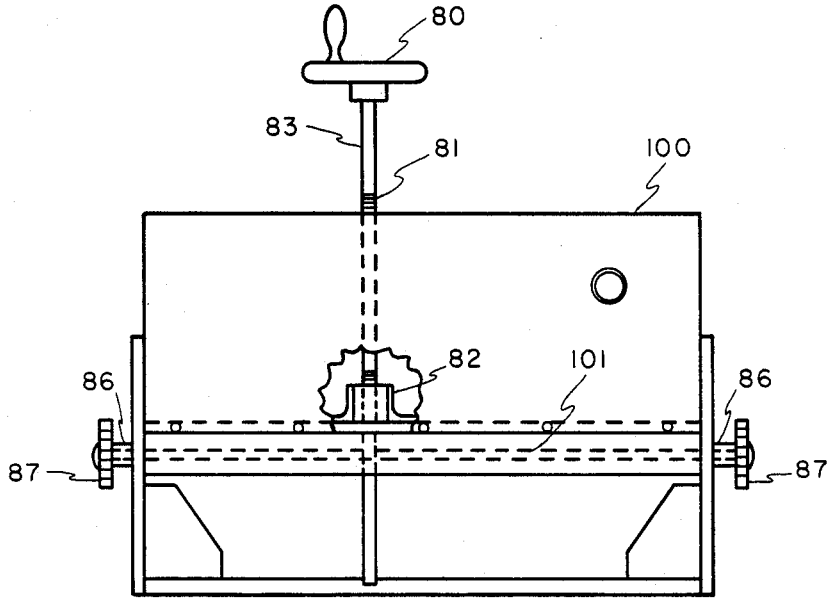
FIG. 4 is a cutaway view illustrating the moveable bottom plate of the inpulse generating means.

FIG. 4 is a cutaway view of unit 100 taken along axis B—B, as shown in FIG. 1. When jack handle 80 is turned, threaded rod 83 rotates within threaded bushings 81 and 82. Since bushing 82 is affixed to moveable bottom plate 101, movement of handle 80 allows pate 101 to be moved up and down within unit 100. Small threaded projections 86 extend from the corners of bottom plate 101 through the slots of front legs 85 and are terminated with screw handles 87. When the optimum height of plate 101 is found, handles 87 are tightened down so that plate 101 is fixed at a certain height. This height will be such that cable 50 may pass in and out of unit 100 as a low angle, so that excessive wear is avoided.

This invention may be implemented in various ways. For example, other tether means, such as rope or fine chain, could be substituted for flexible cable. In place of a switch located inside the rifle, trigger pull could be detected by accoustic monitors located in proximity to the weapon or some other means. Similarly, impluse force could be exerted upon the tether by means other than the described flywheel and clutch system. For example, a very large solenoid could be used.

From the foregoing description, it can be seen that the invention is well adapted to attain each of the objects set forth together with other advantages which are inherent in the apparatus. The detailed description of the invention herein has been with respect to the preferred embodiment. However, it will be understood that variations and modifications can be effected within the spirit and scope of the invention as defined in the appended claims.

What is claimed is:

1. Recoil simulating apparatus for a weapon comprising flexible tether means having at least two ends;

means for attaching a first end of said tether means to a weapon;

detection means for detecting when the trigger of the said weapon is pulled; and means for applying an impulse of force to a second end of said tether means in response to each detection of a trigger pull by said detection means such that weapon recoil is simulated.

2. The recoil simulating apparatus of claim 1 wherein the said tether means is a flexible cable means.

3. The recoil simulating apparatus of claim 2 wherein said cable means is attached to the rear end end of the said weapon.

4. The recoil simulating apparatus of claim 3 wherein said means for applying an impulse of force comprises flywheel means for storing kinetic energy;

remotely activated clutch means having at least an input shaft and an output shaft;

means for applying force to said flexible cable means;

wherein energy from said flywheel means is made available to the said input shaft of said remotely activated clutch means; and wherein said clutch means operates to convey this energy to said output shaft in response to a signal received from said detection means for detecting a trigger pull; and wherein energy present to said output shaft is conveyed to said means for applying force to said flexible cable means, such that an impulse of force, simulating weapon recoil, is supplied to said flexible cable means.

5. The recoil simulator of claim 4 further comprising a slip clutch connected between said remotely activated clutch means and said flywheel means.

6. The recoil simulator of claim 5 further comprising a negator motor connected to said means for applying force to said tether means, which motor is connected such that slack in said flexible cable means is eliminated.

7. Recoil simulating apparatus for a weapon comprising flexible cable means, provided with means for eliminating slack, attached to the rear and of said weapon;

flywheel means;

a slip clutch;

a remotely activated clutch that is activated in response to a signal;

means for generating a signal in response to a trigger pull of said weapon and conveying said signal to said remotely activated clutch;

means for conveying energy from said flywheel means to said remotely activated clutch;

means for conveying motion from said remotely activated clutch to said flexible cable means;

wherein motion from said flywheel means is conveyed to said remotely activated clutch by way of said slip clutch and, in response to a signal from said means for generating a signal, is further conveyed to said flexible cable means such that weapon recoil is simulated.

* * * * *